United States Patent [19]

Itoh et al.

[11] Patent Number: 4,545,416
[45] Date of Patent: Oct. 8, 1985

[54] RADIAL TIRES

[75] Inventors: Michio Itoh; Takehiro Tsukamoto, both of Higashimurayama; Shuichi Watanabe, Tokyo; Takeshi Kinoshita, Higashiyamato; Seisuke Tomita, Tokorozawa, all of Japan

[73] Assignee: Bridgestone Tire Co., Ltd., Tokyo, Japan

[21] Appl. No.: 467,721

[22] Filed: Feb. 18, 1983

[30] Foreign Application Priority Data

Mar. 16, 1982 [JP] Japan ................................. 57-40232

[51] Int. Cl.$^4$ ........................... B60C 9/00; B60C 1/00
[52] U.S. Cl. .................................... 152/539; 152/548; 156/124; 156/910
[58] Field of Search ............... 156/124, 910; 152/356, 152/359, 330 R, 357, 361 R, 361 FP, 361 DM

[56] References Cited

U.S. PATENT DOCUMENTS 1,919,718  7/1933  Gray ................................. 156/307.5
2,912,355  11/1959 Formanek et al. .................. 428/465
4,137,359  1/1979  Bak et al. ............................ 156/124

FOREIGN PATENT DOCUMENTS 1338930  11/1983  United Kingdom .

Primary Examiner—Lois E. Boland
Attorney, Agent, or Firm—Sughrue, Mion, Zinn Macpeak & Seas

[57] ABSTRACT

Radial tires having highly improved durable life by using a rubber composition prepared by incorporating a given amount of a primary fatty acid having 6–10 carbon atoms and/or metal salts of thereof to a rubber for embedding rubber for steel cords in belt portion or carcass portion of radial tires. By further adding thereto cobalt salt of organic acids other than the above described fatty acids and/or boric acid or a metal salt of boric acid, the corrosion resistance of steel cords is synergistically improved.

3 Claims, No Drawings

RADIAL TIRES

BACKGROUND OF THE INVENTION

1. Field of the Invention

The present invention relates to radial tires and more particularly to radial tires in which the durable life is noticeably improved by highly improving corrosion fatigue resistance of steel cord reinforcing materials embedded in rubber.

2. Description of the Prior Art

Prior radial tires reinforced with steel cords have had drawbacks that when these tires are used under corrosive atmosphere, steel cords are corroded, the fatigue resistance of the cords is lowered, the adhesion of steel cords to rubber is reduced and the steel cords are broken and the radial tires cannot be used.

As the cause of causing corrosion, it has been considered that tires are subjected to outer damage and rain water permeates from the outer damages, water remains between a tire and a tube when a tire is mounted on a rim and said water permeates through an inner liner of the tire and a corrosive gas is evolved when tires are vulcanized or run.

A variety of studies have been heretofore made with respect to this problem. For example, Japanese Patent Application Publication No. 24,626/77 has disclosed that a corrosion preventing lubricating oil for metal wire consisting essentially of an ester prepared from benzene tricarboxylic acid and an alcohol having 6–16 carbon atoms or an ester prepared from a fatty acid having 5–24 carbon atoms and a monohydric alcohol having 1–10 carbon atoms is previously applied on steel cords. Japanese Patent Laid-open Application No. 10,454/81 has disclosed that a protective layer of a corrosion preventing agent comprising of a surfactant of benzotriazol derivative, etc. and a film-forming agent (consisting essentially of a hydrocarbon polymer having a softening point or melting point of higher than 50° C.) is applied on steel cord surface.

These processes comprise only applying a slight amount of such treating agents on steel cord surface, so that said agents are removed by rubbing of steel cord filaments due to the input in flow of rubber during vulcanization of tire or when running of tires and the satisfactory corrosion preventing ability cannot be yet obtained.

Japanese Patent Laid-open Application No. 90,692/80 and No. 43,008/81 have disclosed that the twist structure of the steel cord filaments is improved aiming that an embedding rubber composition is fed into the inner portion of steel cords and the inner portion of the cords is completely filled with the rubber composition, whereby the permeation of water is prevented. However, this process is limited in the applicable cord structure and it is impossible to completely feed rubber into the inner portion of the cords and therefore water partially permeates and rust is formed in the steel cords and the expected effect cannot be obtained.

SUMMARY OF THE INVENTION

The inventors have made diligent studies in order to solve the above described problems and found that the addition of primary fatty acids having 6–10 carbon atoms or metal salts thereof to a rubber composition to embed steel cords develops unique corrosion preventing activity, the combined use of cobalt salts of organic acids gives synergistic effect to the corrosion fatigue resistance of steel cord reinforcing materials, and the use of boric acid or a metal salt of boric acid together with a metal salt of a primary fatty acid more synergistically improves the corrosion fatigue resistance while maintaining the adhesion stability of steel cords to rubber.

DESCRIPTION OF THE PREFERRED EMBODIMENTS

The present invention consists in radial tires in which a rubber composition obtained by adding 0.5–10 parts by weight of a primary fatty acid having 6–10 carbon atoms and/or a metal salt thereof to 100 parts by weight of at least one rubber component selected from the group consisting of natural rubber, synthetic polyisoprene rubber, polybutadiene rubber and styrene-butadiene copolymeric rubber is applied to at least one of belt portion and carcass portion of a radial tire as an embedding rubber for steel cord reinforcing materials. This invention is effective for radial tires for passenger cars, radial tires for light trucks, radial tires for truck-bus and tires for construction vehicles, which have steel cord belt layers but particularly, in radial tires for heavy vehicles, such as radial tires for truck-bus, light truck and construction vehicles, the durable life is noticeably improved.

Primary fatty acids having 6–10 carbon atoms according to the present invention include caproic acid, isocaproic acid, enanthic acid, caprylic acid, isocaprylic acid, pelargonic acid, capric acid, isocapric acid, etc. Among these acids, it has been found that linear fatty acids having 6–10 carbon atoms, such as caproic acid, enanthic acid, caprylic acid, pelargonic acid, capric acid and metal salts thereof have the particularly noticeable corrosion preventing activity.

It is the very important discovery firstly found by the inventors that the primary fatty acids having 6–10 carbon atoms and metal salts thereof have the preferential corrosion preventing activity and it has been confirmed that secondary fatty acids, such as 2-ethyl-hexanoic acid, tertiary fatty acids, such as neodecanoic acid (synthetic fatty acid made by Ecson Chemical Co., Ltd.) and metal salts thereof cannot develop the corrosion preventing activity of the object of the present invention. This is presumed because the primary fatty acids are different from the secondary and tertiary fatty acids in the diffusing ability into the rubber compositions and the affinity to metal cords.

It is merely necessary that metals used for metal salts of primary fatty acids in the present invention are transition metals but cobalt and nickel are preferable in view of the adhesion of rubber and metals.

The primary fatty acids having 6–10 carbon atoms are liquid but the metal salts thereof are solid and therefore the addition in the form of metal salts does not need installation of a device for charging liquid to Banbury mixer and the use of the metal salts is preferable.

An amount of the primary fatty acids and/or the metal salts thereof added is 0.5–10 parts by weight based on 100 parts by weight of the rubber component and when said amount is less than 0.5 parts by weight, the corrosion preventing activity is noticeably lowered and when said amount exceeds 10 parts by weight, the adhesion of the embedding rubber and metal cords is lowered, so that such amounts are not preferable. When an amount of the metal salts of the primary fatty acids is 0.5–5 parts by weight, the heat aging resistance of adhesion of the embedding rubber and metal cords is improved and such an amount is preferable.

Furthermore, the inventors have found that when the primary fatty acids having 6–10 carbon atoms and/or the metal salts thereof are added together with cobalt salts of the other organic acids, the corrosion preventing activity is synergistically more enhanced. The term "cobalt salts of the other organic acids" used herein means cobalt salts of organic acids other than cobalt salts of the primary fatty acids salts having 6–10 carbon atoms, for example, cobalt naphthenate, cobalt stearate, cobalt palmitate, cobalt myristate, cobalt resin acid (including cobalt abietate), cobalt tall oil acid, cobalt neodecanate, cobalt versatate, cobalt 2-ethylhexanoate, etc. These cobalt salts of organic acids themselves do not show the desired corrosion preventing activity, so that it is unexpected results that the addition of these cobalt salts together with the primary fatty acids having 6–10 carbon atoms and/or the metal salts thereof shows the synergistic corrosion preventing activity.

Among the above described cobalt salts of organic acids, cobalt naphthenate and/or cobalt stearate show particularly high corrosion preventing activity and these salts are preferable. When the metal salts of the primary fatty acids and cobalt salts of the other organic acids are used in combination, 0.5–5 parts by weight, preferably, 0.5–3 parts by weight of metal salts of the primary fatty acids and 0.5–5 parts by weight, preferably 0.5–3 parts by weight of cobalt salts of the other organic acids are added to 100 parts by weight of the above described rubber components. When the metal salts of the primary fatty acids or cobalt salts of the organic acids is less than 0.5 part by weight, the synergistic effect cannot be developed and when the amount exceeds 5 parts by weight, the adhesion of the rubber compositions to metal cords, particularly the heat aging resistance of adhesion is lowered and such amounts are not preferable.

When the primary fatty acids having 6–10 carbon atoms and cobalt salts of the other organic acids are used in combination, 0.5–10 parts by weight of the primary fatty acids and 0.5–5 parts by weight of cobalt salts of the other organic acids are added and as in the above described case, when an amount of the primary fatty acids or cobalt salts of the organic acids is less than 0.5 part by weight, the synergistic effect cannot be developed and when the primary fatty acid exceeds 10 parts by weight or cobalt salts of the organic acids exceeds 5 parts by weight, the adhesion of the rubber compositions to metal cords, particularly the heat aging resistance of adhesion is lowered and such amounts are not preferable. Particularly, even if the amount of the primary fatty acids exceeds 10 parts by weight, the higher corrosion preventing activity cannot be expected and the original adhesion (adhesion prior to using tires) of metal cords and the embedding rubber after vulcanization of tires is not only lowered, but also the modulus of the embedded rubber after vulcanization is lowered, so that such an amount is not preferable.

Moreover, it has been found that when 0.1–5 parts by weight of boric acid or metal salts or boric acid is added together with 0.5–10 parts by weight of the primary fatty acids having 6–10 carbon atoms and/or metal salts thereof to 100 parts by weight of at least one rubber component selected from the group consisting of natural rubber, synthetic polyisoprene rubber, polybutadiene rubber and styrene-butadiene copolymeric rubber, the corrosion fatigue resistance of steel cords can be more highly improved than the case where metal salts of the primary fatty acids alone or the combination of said salts and cobalt salts of the organic acids are used, while maintaining the adhesion stability when coated steel cords (steel cords coated with a sheeted thin unvulcanized rubber sheet) are left to stand.

In this case, it is desirable to add 0.1–5 parts by weight of boric acid or metal salts of boric acid together with 0.5–10 parts by weight of metal salts of the primary fatty acids having 6–10 carbon atoms or 0.5–5 parts by weight of said metal salts and 0.5–5 parts by weight of cobalt salt of the other organic acids to 100 parts by weight of at least one rubber component selected from the group consisting of natural rubber, synthetic polyisoprene rubber and polybutadiene rubber.

Metals to be used as metal salts of boric acid are Zn, Ni, Ca, Mn, Pb, Na, Co, etc. and Zn and Ca are preferable.

Boric acid includes ortho-boric acid ($H_3BO_3$), meta-boric acid ($HBO_2$) and unhydrous boric acid ($B_2O_3$). An amount of metal salts of the primary fatty acids is 0.5–10 parts by weight based on 100 parts by weight of rubber component and when said amount is less than 0.5 part by weight, the corrosion preventing activity is noticeably lowered and when said amount exceeds 10 parts by weight, the adhesion of the embedding rubber and metal cords is lowered and such amounts are not preferable. The addition of boric acid or metal salts of boric acid is 0.1–5 parts by weight based on 100 parts by weight of rubber component. When said amount is less than 0.1 part by weight, some effect is obtained in view of the corrosion preventing activity but the synergistic effect of the above described metal salts of the primary fatty acids is not sufficient, and when said amount exceeds 5 parts by weight, the modulus and the rupture strength of the physical properties of rubber after vulcanization are lowered, so that such amounts are not preferable.

In embedding rubbers for tires in the present invention, 10–100 parts by weight of carbon black may be added to 100 parts by weight of usual rubber component but additives, such as a vulcanizing agent, an accelerating agent, an acceleration activator, a filler such as silica, a softening agent and the like may be incorporated within usual range of incorporated amount.

The following examples are given for the purpose of illustration of this invention and are not intended as limitations thereof.

EXAMPLE 1

By using 26 kinds of embedding rubber compositions for belt layers shown in Table 1, radial tires of size 10.00 R20 for truck-bus were prepared. The detail of these tires is as follows.

| Carcass layer | 1 sheet |
| --- | --- |
| Used cord | 3 + 9 + 15 × 0.175 + 1 (layer twist) |
| End number | 13 cords/2.5 cm |
| Belt layer | 4 sheets |
| Used cord | 3 + 6 × 0.38 (double twist) |
| End number | 13 cords/2.5 cm. |

Original adhesion, adhesion after heat aging and adhesion after left to stand under atmosphere having a high humidity were determined with respect to the above described 26 kinds of tires and for evaluation of a corrosion fatigue resistance, a fatigue test of metal cords after running on a drum under water corrosive condition and a test for adhesion of belt portion and fatigue of metal cords after practical running of tire were carried out. The obtained results are shown in Table 1.

EXAMPLE 2

Radial tires for truck-bus of a size of 10.00 R20 were prepared with 22 kinds of embedding rubber compositions for carcass ply layer shown in Table 2. The detail of these tires was the same as described in Example 1.

Original adhesion, adhesion after heat aging and adhesion after left to stand under atmosphere having a high humidity were determined with respect to the above described 22 kinds of tires in the same manner as described in Example 1 and for evaluation of the corrosion preventing activity the adhesion of carcass ply after practical running of tire, the corroded state and the strength retention ratio of cord were determined. The obtained results are shown in Table 2.

TABLE 1

| | Tire No. 1 Comp. Ex. | 2 Comp. Ex. | 3 Example | 4 Example | 5 Example | 6 Comp. Ex. | 7 Comp. Ex. | 8 Example | 9 Comp. Ex. | 10 Comp. Ex. | 11 Example | 12 Example | 13 Example |
|---|---|---|---|---|---|---|---|---|---|---|---|---|---|
| Embedding rubber composition for belt layer | | | | | | | | | | | | | |
| Natural rubber | 90 | 90 | 90 | 90 | 90 | 90 | 90 | 90 | 90 | 90 | 90 | 90 | 90 |
| Synthetic polyisoprene rubber *1 | 10 | 10 | 10 | 10 | 10 | 10 | 10 | 10 | 10 | 10 | 10 | 10 | 10 |
| Carbon black HAF | 50 | 50 | 50 | 50 | 50 | 50 | 50 | 50 | 50 | 50 | 50 | 50 | 50 |
| Antioxidant *2 | 1 | 1 | 1 | 1 | 1 | 1 | 1 | 1 | 1 | 1 | 1 | 1 | 1 |
| Aromatic oil | 2 | 2 | 2 | 2 | 2 | 2 | 2 | 2 | 2 | 2 | 2 | 2 | 2 |
| n-Valeric acid | — | 3 | — | — | — | — | — | — | — | — | — | — | — |
| Caproic acid | — | — | 3 | — | — | — | — | — | — | — | 3 | — | — |
| Caprylic acid | — | — | — | 3 | — | — | — | — | — | — | — | 3 | — |
| Capric acid | — | — | — | — | 3 | — | — | — | — | — | — | — | 3 |
| Myristic acid | — | — | — | — | — | 3 | — | — | — | — | — | — | — |
| Co n-valerate | — | — | — | — | — | — | — | — | — | — | — | — | — |
| Co caproate | — | — | — | — | — | — | — | — | — | — | — | — | — |
| Co caprylate | — | — | — | — | — | — | — | 5 | — | — | 3 | — | — |
| Co caprate | — | — | — | — | — | — | — | — | — | 3 | — | 3 | — |
| Co myristate | — | — | — | — | — | — | — | — | — | — | — | — | 3 |
| Co stearate | — | — | — | — | — | 3 | — | — | — | — | — | — | — |
| Co naphthenate | 3 | — | — | — | — | — | 0.3 | — | 12 | — | — | — | — |
| Ortho-boric acid | — | — | — | — | — | — | — | — | — | — | — | — | — |
| Zn ortho-borate | — | — | — | — | — | — | — | — | — | — | — | — | — |
| Ca ortho-borate | — | — | — | — | — | — | — | — | — | — | — | — | — |
| Zinc white | 8 | 8 | 8 | 8 | 8 | 8 | 8 | 8 | 8 | 8 | 8 | 8 | 8 |
| Accelerator *3 | 0.5 | 0.5 | 0.5 | 0.5 | 0.5 | 0.5 | 0.5 | 0.5 | 0.5 | 0.5 | 0.5 | 0.5 | 0.5 |
| Sulfur | 5 | 5 | 5 | 5 | 5 | 5 | 5 | 5 | 5 | 5 | 5 | 5 | 5 |
| Adhesion of tire belt portion | | | | | | | | | | | | | |
| Original adhesion | A | B | A | A | A | A | B | A | C | B | A | A | A |
| Adhesion after heat aging | C | C | B | B | B | B | B | B | E | C | B | B | B |
| Adhesion after left to stand under atmosphere having a high humidity | E | E | A | A | A | E | D | B | D | E | A | A | A |
| Corrosion fatigue resistance | | | | | | | | | | | | | |
| Fatigue test after running on a drum | 100 | 94 | 132 | 143 | 129 | 104 | 102 | 133 | 111 | 106 | 146 | 157 | 153 |
| Adhesion of belt portion after practical running of tire | B | B | A | A | A | B | B | A | C | B | A | A | A |
| Fatigue test after practical running | 100 | 91 | 123 | 134 | 120 | 105 | 96 | 131 | 77 | 103 | 140 | 142 | 135 |

TABLE 1-continued

| Embedding rubber composition for belt layer of tire | 14 Comparative Example | 15 Comparative Example | 16 Comparative Example | 17 Comparative Example | 18 Comparative Example | 19 Example | 20 Example | 21 Example | 22 Example | 23 Example | 24 Example | 25 Example | 26 Example |
|---|---|---|---|---|---|---|---|---|---|---|---|---|---|
| Natural rubber | 90 | 90 | 90 | 90 | 90 | 90 | 90 | 90 | 90 | 90 | 90 | 90 | 90 |
| Synthetic polyisoprene rubber *1 | 10 | 10 | 10 | 10 | 10 | 10 | 10 | 10 | 10 | 10 | 10 | 10 | 10 |
| Carbon black HAF | 50 | 50 | 50 | 50 | 50 | 50 | 50 | 50 | 50 | 50 | 50 | 50 | 50 |
| Antioxidant *2 | 1 | 1 | 1 | 1 | 1 | 1 | 1 | 1 | 1 | 1 | 1 | 1 | 1 |
| Aromatic oil | 2 | 2 | 2 | 2 | 2 | 2 | 2 | 2 | 2 | 2 | 2 | 2 | 2 |
| n-Valeric acid | — | — | — | — | — | — | — | — | — | — | — | — | — |
| Caproic acid | — | — | — | — | — | — | — | — | — | — | — | — | — |
| Caprylic acid | — | 0.3 | 12 | 3 | 3 | — | — | — | — | — | — | — | — |
| Capric acid | — | — | — | — | — | — | — | — | — | — | — | — | — |
| Myristic acid | 3 | — | — | — | — | — | — | — | — | — | — | — | — |
| Co n-valerate | — | — | — | — | — | 3 | — | — | — | — | — | — | — |
| Co caproate | — | — | — | — | — | — | 3 | — | — | — | — | — | — |
| Co caprylate | — | — | — | — | — | — | — | 3 | 3 | 3 | 3 | 3 | 3 |
| Co caprate | — | — | — | — | — | — | — | — | — | — | — | — | — |
| Co myristate | 3 | — | — | — | — | — | — | — | — | — | — | — | — |
| Co stearate | — | 3 | 3 | 0.8 | 8 | 2 | 2 | 2 | 2 | 2 | 2 | 2 | 2 |
| Co naphthenate | — | — | — | — | — | — | — | — | — | — | — | — | — |
| Ortho-boric acid | — | — | — | — | — | — | — | — | — | — | — | — | — |
| Zn ortho-borate | — | — | — | — | — | — | — | — | — | — | — | 2 | 2 |
| Ca ortho-borate | — | — | — | — | — | — | — | — | — | — | 2 | — | 2 |
| Zinc white | 8 | 8 | 8 | 8 | 8 | 8 | 8 | 8 | 8 | 8 | 8 | 8 | 8 |
| Sulfur | 5 | 5 | 5 | 5 | 5 | 5 | 5 | 5 | 5 | 5 | 5 | 5 | 5 |
| Accelerator *3 | 0.5 | 0.5 | 0.5 | 0.5 | 0.5 | 0.5 | 0.5 | 0.5 | 0.5 | 0.5 | 0.5 | 0.5 | 0.5 |
| Adhesion of tire belt portion | | | | | | | | | | | | | |
| Original adhesion | A | A | B | B | B | A | A | A | A | A | A | A | A |
| Adhesion after heat aging | B | C | D | E | E | B | B | B | A | A | A | A | A |
| Adhesion after left to stand under atmosphere having a high humidity | D | D | C | E | D | A | A | A | A | A | A | A | A |
| Corrosion fatigue resistance | | | | | | | | | | | | | |
| Fatigue test after running on a drum | 107 | 106 | 117 | 94 | 107 | 166 | 188 | 173 | 185 | 204 | 190 | 185 | 253 |
| Adhesion of belt portion after practical running of tire | B | B | B | B | C | A | A | A | A | A | A | A | A |
| Fatigue test after practical running of tire | 96 | 105 | 94 | 90 | 88 | 160 | 175 | 173 | 195 | 195 | 178 | 180 | 239 |

TABLE 1-continued practical running
of tire

*1: IR-2200 made by Japan Synthetic Rubber Co., Ltd.
*2: N—phenyl-N'—isopropyl-p-phenylenediamine Nocrack 810NA made by Ouchi Shinko Chemical Co., Ltd.
*3: N—oxydiethylene-2-benzothiazole sulfenamide Noccelar MSA made by Ouchi Shinko Chemical Co., Ltd.

TABLE 2

| | Tire No. | | | | | | | | | | |
|---|---|---|---|---|---|---|---|---|---|---|---|
| | 27 Comparative Example | 28 Comparative Example | 29 Example | 30 Example | 31 Example | 32 Comparative Example | 33 Comparative Example | 34 Comparative Example | 35 Example | 36 Example | 37 Example |
| Embedding rubber composition for carcass ply layer | | | | | | | | | | | |
| Natural rubber | 90 | 90 | 90 | 90 | 90 | 90 | 90 | 90 | 90 | 90 | 90 |
| Polybutadiene rubber *4 | 10 | 10 | 10 | 10 | 10 | 10 | 10 | 10 | 10 | 10 | 10 |
| Carbon black HAF | 43 | 43 | 43 | 43 | 43 | 43 | 43 | 43 | 43 | 43 | 43 |
| Antioxidant *2 | 1 | 1 | 1 | 1 | 1 | 1 | 1 | 1 | 1 | 1 | 1 |
| Aromatic oil | 2 | 2 | 2 | 2 | 2 | 2 | 2 | 2 | 2 | 2 | 2 |
| n-valeric acid | — | 3 | — | — | — | — | — | — | — | — | — |
| Caproic acid | — | — | 3 | — | — | — | — | — | — | — | — |
| Caprylic acid | — | — | — | 3 | — | — | 0.3 | 12 | — | — | — |
| Capric acid | — | — | — | — | 3 | — | — | — | — | — | — |
| Myristic acid | — | — | — | — | — | 3 | — | — | — | — | — |
| Co n-valerate | — | — | — | — | — | — | — | — | — | — | — |
| Co caproate | — | — | — | — | — | — | — | — | 3 | — | — |
| Co caprylate | — | — | — | — | — | — | — | — | — | 3 | — |
| Co caprate | — | — | — | — | — | — | — | — | — | — | 3 |
| Co myristate | — | — | — | — | — | — | — | — | — | — | — |
| Co stearate | — | — | — | — | — | — | — | — | — | — | — |
| Co naphthenate | 3 | 3 | 3 | 3 | 3 | 3 | 3 | 3 | — | — | — |
| Ortho-boric acid | — | — | — | — | — | — | — | — | — | — | — |
| Zn ortho-borate | — | — | — | — | — | — | — | — | — | — | — |
| Ca ortho-borate | — | — | — | — | — | — | — | — | — | — | — |
| Zinc white | 5 | 5 | 5 | 5 | 5 | 5 | 5 | 5 | 5 | 5 | 5 |
| Accelerator *3 | 0.5 | 0.5 | 0.5 | 0.5 | 0.5 | 0.5 | 0.5 | 0.5 | 0.5 | 0.5 | 0.5 |
| Sulfur | 4.5 | 4.5 | 4.5 | 4.5 | 4.5 | 4.5 | 4.5 | 4.5 | 4.5 | 4.5 | 4.5 |
| Adhesion of tire carcass ply layer | | | | | | | | | | | |
| Original adhesion | A | B | A | A | A | A | A | B | A | A | A |
| Adhesion after heat aging | C | C | B | B | B | B | C | D | B | B | B |
| Adhesion after left to stand under atmosphere having high humidity | E | D | B | B | B | D | D | C | B | B | B |
| Corrosion preventing activity | | | | | | | | | | | |
| Adhesion of carcass ply after practical running of tire | B | B | A | A | A | B | B | B | A | A | A |
| Corroded state after practical running of tire | E | D | B | B | B | D | E | D | B | B | B |
| Strength retention ratio of cord (%) | 68 | 78 | 86 | 89 | 87 | 75 | 69 | 71 | 82 | 83 | 83 |

| | Tire No. | | | | | | | | | | |
|---|---|---|---|---|---|---|---|---|---|---|---|
| | 38 Comparative Example | 39 Comparative Example | 40 Example | 41 Example | 42 Example | 43 Comparative Example | 44 Comparative Example | 45 Comparative Example | 46 Example | 47 Example | 48 Example |
| Embedding rubber composition for carcass ply layer | | | | | | | | | | | |
| Natural rubber | 90 | 90 | 90 | 90 | 90 | 90 | 90 | 90 | 90 | 90 | 90 |
| Polybutadiene rubber *4 | 10 | 10 | 10 | 10 | 10 | 10 | 10 | 10 | 10 | 10 | 10 |
| Carbon black HAF | 43 | 43 | 43 | 43 | 43 | 43 | 43 | 43 | 43 | 43 | 42 |
| Antioxidant *2 | 1 | 1 | 1 | 1 | 1 | 1 | 1 | 1 | 1 | 1 | 1 |
| Aromatic oil | 2 | 2 | 2 | 2 | 2 | 2 | 2 | 2 | 2 | 2 | 2 |
| n-valeric acid | — | — | — | — | — | — | — | — | — | — | — |
| Caproic acid | — | — | — | — | — | — | — | — | — | — | — |
| Caprylic acid | — | — | — | — | — | — | — | — | — | — | — |
| Capric acid | — | — | — | — | — | — | — | — | — | — | — |
| Myristic acid | — | — | — | — | — | — | — | — | — | — | — |
| Co n-valerate | — | 3 | — | — | — | — | — | — | — | — | — |
| Co caproate | — | — | 3 | — | — | — | — | — | 3 | — | — |
| Co caprylate | — | — | — | 3 | — | — | 0.3 | 6 | — | 3 | — |
| Co caprate | — | — | — | — | 3 | — | — | — | — | — | 3 |
| Co myristate | — | — | — | — | — | 3 | — | — | — | — | — |
| Co stearate | 3 | 2 | 2 | 2 | 2 | 2 | 0.3 | 6 | — | — | — |
| Co naphthenate | — | — | — | — | — | — | — | — | — | — | — |
| Ortho-boric acid | — | — | — | — | — | — | — | — | 2 | 2 | — |
| Zn ortho-borate | — | — | — | — | — | — | — | — | — | — | — |
| Ca ortho-borate | — | — | — | — | — | — | — | — | — | — | 2 |
| Zinc white | 5 | 5 | 5 | 5 | 5 | 5 | 5 | 5 | 5 | 5 | 5 |
| Accelerator *3 | 0.5 | 0.5 | 0.5 | 0.5 | 0.5 | 0.5 | 0.5 | 0.5 | 0.5 | 0.5 | 0.5 |
| Sulfur | 4.5 | 4.5 | 4.5 | 4.5 | 4.5 | 4.5 | 4.5 | 4.5 | 4.5 | 4.5 | 4.5 |
| Adhesion of tire carcass ply layer | | | | | | | | | | | |
| Original adhesion | A | B | A | A | A | A | B | C | A | A | A |
| Adhesion after heat aging | C | C | B | B | B | B | E | E | A | A | A |
| Adhesion after left to stand | E | E | B | B | B | D | E | D | A | A | A |

TABLE 2-continued

| | | | | | | | | | | | |
|---|---|---|---|---|---|---|---|---|---|---|---|
| under atmosphere having high humidity | | | | | | | | | | | |
| Corrosion preventing activity | | | | | | | | | | | |
| Adhesion of carcass ply after practical running of tire | B | B | A | A | A | B | B | C | A | A | A |
| Corroded state after practical running of tire | E | D | A | A | A | D | E | D | A | A | A |
| Strength retention ratio of cord (%) | 66 | 76 | 92 | 93 | 93 | 74 | 65 | 75 | 95 | 96 | 95 |

*2 and *3 are same as in Table 1
*4: BR-01 made by Japan Synthetic Rubber Co., Ltd.

The evaluating means in Example 1 and Example 2 are illustrated hereinafter.

Original adhesion

Belt portion and carcass ply portion were cut out from a test tire and subjected to a separation test between a metal cord and an embedding rubber following to JIS K6301 separation test and the adhesion was evaluated by an amount of rubber remained on the cord. The state where rubber is stuck on more than 90% of the separated cord surface is referred to as "A", 75%–90% is referred to as "B", 50%-less than 75% is referred to as "C", 25%-less than 50% is referred to as "D" and less than 25% is referred to as "E". Evaluation was made with respect to the belt layer of the outermost later in Example 1 and with respect to the carcass ply layer of the shoulder portion.

Adhesion after heat aging

The test tire was left to stand in a large size of oven at 120° C. for a given period without mounting on a rim and then the adhesion was determined in the same manner as in the original adhesion. In both Example 1 and Example 2, the test tire was left to stand in the oven for 9 days.

Adhesion after left to stand under atmosphere having a high humidity

The tread portion and the inner liner portion of the test tire were peeled off and were left to stand in a large size of chamber having a constant temperature and a constant humidity at 70° C.×90%RH for 14 days without mounting on a rim and then the adhesion was determined in the same manner as in the original adhesion. In both Example 1 and Example 2, the test tires were left to stand under the same condition.

Fatigue test of metal cords after running on a drum under corrosive condition due to water Tread rubber having a diameter of about 50 mm was peeled off from the central portion of tread portion of the test TBR tire so that about 1 mm of rubber remains on a steel cord of the outermost layer of belt and the test tire was run 5,000 km under such a condition that the tire was rotated while dipping in water with rotation of the drum and the portion where the rubber has been peeled off, was always wetted with water during rotating the tire. In this case, the load, inner pressure and speed were 2,425 kg, 7.25 kg/cm$^2$ and 60 km/hr respectively.

10 cords at the outermost layer of the belt were taken out from the rubber peeled-off portion of the tire run on the drum and the rotation bend fatigue test was made at a bending radius of 60 mm and a rotation speed of 3,000 RPM and the number of rotation was measured until the cord was broken. The result was shown by the following formula by determining an average value of the results of 10 tires $$\frac{\text{Rotation number until the cords of the test tire are broken}}{\text{Rotation number until the cords of Tire No. 1 are broken}} \times 100$$

Thus, the larger the numeral value, the higher the corrosion preventing activity is.

Adhesion and fatigue test of belt portion after practical running of tire 26 kinds of tires is Example 1 were run 70,000 km on general road where well-paved road and rock-projecting bad road are alternately connected, at an average speed of about 40 km/hr and a metal cord sampled from the belt portion of the run tire was subjected to adhesion test in the same manner as in the original adhesion test and to fatigue test in the same manner as in the above described item of fatigue test after running on drum.

Adhesion and corroded state of carcass ply after practical running of tire and strength retention ratio of cord 22 kinds of tires in Example 22 were fitted to a truck running on a highway for a long distance by sealing 200 cc of water between a tube and a tire in order to promote corrosion and run 150,000 km and then the tires were recovered and the adhesion, corroded state, strength retention ratio of cord were determined at four portions on circumference of the tire carcass layer. The rim mounting was repeated at the points after running 50,000 km and 100,000 km and 200 cc of water was sealed in.

The adhesion was tested in the same manner as in the above described original adhesion. The corroded state is shown by observing the corroded state to core of the carcass ply cord or filaments of a first sheath to which rubber is not stuck and a case where the area ratio of the non-corroded portion is less than 10%, is referred to as "A", a case of 10%-less than 20% is referred to as "B", a case of 20%-less than 40% is referred to as "C", a case of 40%-less than 60% is referred to as "D", a case of 60%-less than 80% is referred to as "E" and a case of 80% or more is referred to as "F". The strength retention ratio was determined as follows. 10 cords were taken out from each of four portions on circumference of the tire, that is 40 cords were taken out in total and the strength of cord was measured with respect to 40 cords and an average value thereof was determined.

$$\text{Strength retention ratio} = \frac{\text{Said average strength}}{\text{Strength prior to fatigue}} \times 100$$

From the results of Examples 1 and 2 it can be seen that in the steel radial tires according to the present invention wherein the primary fatty acids and/or metal salts thereof are incorporated in embedding rubber of the belt portion or the carcass ply portion, the corrosion resistance of metal cords is noticeably improved and the durable life is greatly improved.

What is claimed is:

1. Radial tires wherein a rubber composition, to be used for embedding steel cord of at least one of belt and carcass of a radial tire, comprises 0.5-10 parts by weight of a transition metal salt selected from a cobalt salt and a nickel salt of at least one of a primary fatty acid having 6-10 carbon atoms, 100 parts by weight of at least one rubber component selected from the group consisting of natural rubber, synthetic polyisoprene rubber, polybutadiene rubber and styrene-butadiene copolymeric rubber and 0.1-5 parts by weight of boric acid or a metal salt of boric acid based on 100 parts by weight of the rubber component.

2. Radial tires as claimed in claim 1, wherein said rubber composition comprises 0.5-5 parts by weight of a transition metal salt selected from a cobalt salt and a nickel salt of a primary fatty acid having 5-10 carbon atoms, 0.5-5 parts by weight of a cobalt salt of an organic acid other than the primary fatty acids having 6-10 carbon atoms, 100 parts by weight of at least one rubbher component selected from the group consisting of natural rubber, synthetic polyisoprene rubber, polybutadiene rubber and styrene-butadiene copolymeric rubber and 0.1-5 parts by weight of boric acid or a metal salt of boric acid based on 100 parts by weight of the rubber component.

3. Radial tires as claimed in claim 2, wherein said cobalt salt of an organic acid other than the primary fatty acids having 6-10 carbon atoms, is cobalt naphthenate or cobalt stearate.

* * * * *